United States Patent
Chang et al.

(10) Patent No.: US 10,186,231 B2
(45) Date of Patent: Jan. 22, 2019

(54) DISPLAY SYSTEM

(71) Applicant: Sitronix Technology Corporation, Jhubei, Hsinchu County (TW)

(72) Inventors: Chih-Wei Chang, Juhbei (TW); Shih-Wei Peng, Jhubei (TW)

(73) Assignee: SITRONIX TECHNOLOGY CORPORATION, Jhubei, Hsinchu County (TW)

( * ) Notice: Subject to any disclaimer, the term of this patent is extended or adjusted under 35 U.S.C. 154(b) by 25 days.

(21) Appl. No.: 15/400,128

(22) Filed: Jan. 6, 2017

(65) Prior Publication Data

US 2017/0365232 A1 Dec. 21, 2017

Related U.S. Application Data

(60) Provisional application No. 62/350,926, filed on Jun. 16, 2016.

(51) Int. Cl.
| | |
|---|---|
| *G09G 5/00* | (2006.01) |
| *G09G 5/12* | (2006.01) |
| *G09G 5/18* | (2006.01) |

(52) U.S. Cl.
CPC .............. *G09G 5/008* (2013.01); *G09G 5/12* (2013.01); *B60Y 2400/92* (2013.01); *G09G 5/18* (2013.01); *G09G 2310/0297* (2013.01); *G09G 2320/0233* (2013.01); *G09G 2330/08* (2013.01); *G09G 2340/10* (2013.01); *G09G 2340/12* (2013.01);
(Continued)

(58) Field of Classification Search
None
See application file for complete search history.

(56) References Cited

U.S. PATENT DOCUMENTS

| 7,683,771 B1 | 3/2010 | Loeb |
| 2001/0012976 A1 | 8/2001 | Menig et al. |
(Continued)

FOREIGN PATENT DOCUMENTS

| CN | 2836130 Y | 11/2006 |
| TW | 201406579 A | 2/2014 |

OTHER PUBLICATIONS

Intellectual Property Office Ministry of Economic Affairs, R.O.C., "Office Action", dated Dec. 20, 2017, Taiwan.

*Primary Examiner* — Joseph R Haley
(74) *Attorney, Agent, or Firm* — Locke Lord LLP; Tim Tingkang Xia, Esq.

(57) ABSTRACT

This disclosure provides a display system, which comprises: a mainframe; a control module comprising an image processing unit and an image compositing unit, communicating with the mainframe through a first channel and a second channel, and generating an image signal; and a display panel showing pictures according to the image signal; wherein the mainframe provides the image processing unit with image data, parameter data and control signals through both the first and second channels when the first channel works, and the image processing unit processes the image data and the parameter data and generates a first data signal to be the image signal; wherein the mainframe provides the image compositing unit with response data through the second channel when the first channel fails, and the image compositing unit combines the response data and a pre-determined background into a second data signal to be the image signal.

15 Claims, 7 Drawing Sheets

(52) U.S. Cl.
CPC ... *G09G 2370/045* (2013.01); *G09G 2380/10* (2013.01)

(56) References Cited

U.S. PATENT DOCUMENTS

| | | | |
|---|---|---|---|
| 2008/0218232 A1* | 9/2008 | Jeon | G09G 3/20 327/165 |
| 2009/0102632 A1 | 4/2009 | Kobayashi et al. | |
| 2013/0250186 A1* | 9/2013 | Bushell | G01C 23/005 348/790 |
| 2017/0199714 A1* | 7/2017 | Kim | G09G 3/006 |

* cited by examiner

DISPLAY SYSTEM

CROSS REFERENCE TO RELATED APPLICATION

This application claims the benefit of U.S. provisional application Ser. No. 62/350,926, filed Jun. 16, 2016, the disclosure of which is incorporated by reference herein in its entirety

FIELD OF THE INVENTION

The present invention relates to a display system, and more particularly, to a display system with various displaying modes.

BACKGROUND OF THE INVENTION

Figure 1:
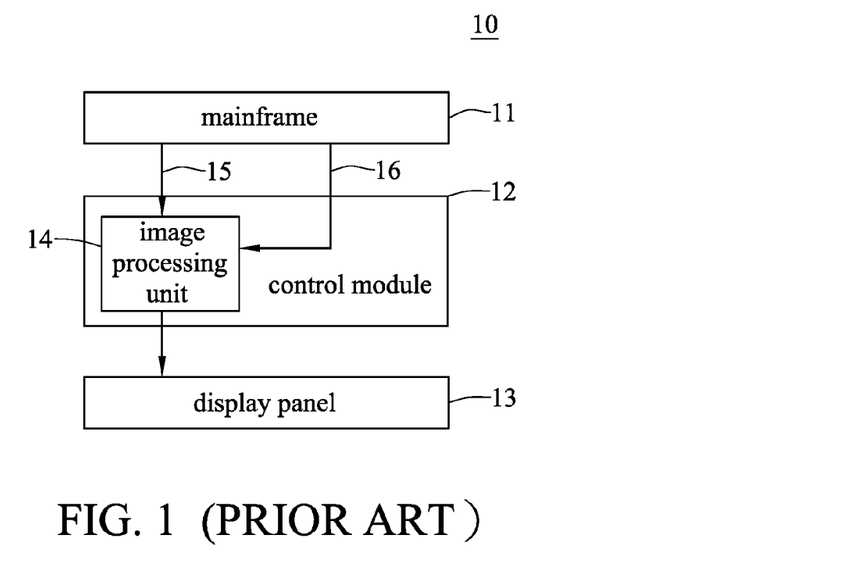
FIG. 1 is a block diagram of a prior-art display system.

Conventionally, a display system 10 is composed of a mainframe 11, a control module 12 and a display panel 13, with its block diagram shown in FIG. 1. The mainframe 11 will provide the control module 12 with image data, parameter data and control signals according to the pictures to be displayed on the display panel 13. The control module 12 includes an image processing unit 14 which processes the image data, parameter data and control signals to generate an image signal to be delivered to the display panel 13, and the display panel 13 shows the pictures on its screen according to the image signal. The image data may include intensity values of all pixels in the pictures and have a much more throughput than the parameter data, which is delivered from the mainframe 11 to the image processing unit 14 through a so-called "parameter-data transmission" interface 16. An example of the parameter data would be a data format of pixel, by which the display panel 13 can show the pictures according to the image data. The control signals may include clock (CLK) signal, data enabling (DE) signal, horizontal synchronization (HS) signal and vertical synchronization (VS) signal, and all these image data, parameter data and control signals are delivered from the mainframe 11 to the image processing unit 14 through a so-called "image-data transmission" interface 15.

As recited above, the image data has a much more throughput than the parameter data, so the probability of failure occurring in the image-data transmission interface 15 is much more than that in the parameter-data transmission interface 16. The image data cannot be correctly displayed on the display panel 13 when the image-data transmission interface 15 fails to work in good working conditions, causing the users unable to obtain enough information for their operation. Even more, for a vehicle user, the driver might be in danger if he got wrong information. Therefore, it is in need of a new and advanced display system with various displaying modes, which can still provide key information for the users even if the image-data transmission interface 15 fails.

SUMMARY OF THE INVENTION

According to one aspect of the present disclosure, one embodiment provides a display system, which comprises: a mainframe; a control module comprising an image processing unit and an image compositing unit, communicating with the mainframe through a first channel and a second channel, and generating an image signal; and a display panel showing pictures according to the image signal; wherein the mainframe provides the image processing unit with image data, parameter data and control signals through both the first and second channels when the first channel works, and the image processing unit processes the image data and the parameter data and generates a first data signal to be the image signal; wherein the mainframe provides the image compositing unit with response data through the second channel when the first channel fails, and the image compositing unit combines the response data and a pre-determined background into a second data signal to be the image signal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

In the following embodiments of the present disclosure, when an element is described to be disposed above/mounted on top of or below/under another element, it comprises either the element is directly or indirectly disposed above/below the other element, i.e. when indirectly, there can be some other element arranged between the two; and when directly, there is no other element disposed between the two. It is noted that the descriptions in the present disclosure relate to "above" or "below" are based upon the related diagrams provided, but are not limited thereby. Moreover, the terms "first", "second", and "third", and so on, are simply used for clearly identifying different elements of the same nature, but those elements are not restricted thereby and must be positioned or arranged accordingly. In addition, the size or thickness of each and every element provided in the following diagrams of the present disclosure is only schematic representation used for illustration and may not represent its actual size.

Figure 2:
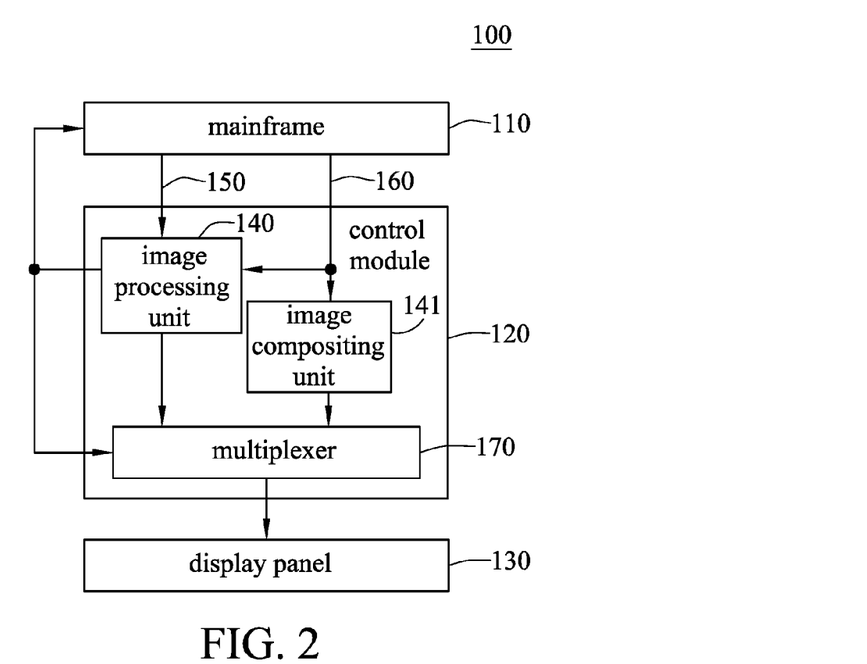
FIG. 2 is a block diagram of a display system according to one embodiment of the present disclosure.

Please refer to FIG. 2, which is a block diagram of a display system 100 according to one embodiment of the present disclosure. The display system 100 includes a mainframe 110, a control module 120 and a display panel 130, in which the control module 120 includes an image processing unit 140 and an image compositing unit 141 and is configured for generating an image signal to be delivered to the display panel 130, and the display panel 130 is used to show pictures on its screen according to the image signal output of the control module 120.

When the display system 100 serves in good working conditions, the mainframe 110 will provide the control module 120 with image data, parameter data and control signals according to the pictures to be shown on the display panel 130. Here, inside the control module 120, the image processing unit 140 is in charge of processing the image data and the parameter data to generate a first data signal as the image signal. As the prior-art display system, the image data includes intensity values of all pixels in the pictures and the control signals are periodic logic signals, including clock (CLK) signal, data enabling (DE) signal, horizontal synchronization (HS) signal and vertical synchronization (VS) signal. Being periodic logic signals, all the control signals oscillate between logic high and low levels. The image data is delivered along with the control signals through a first channel 150 from the mainframe 110 to the control module 120. For example, the "image-data transmission interface" in the art can be used as the first channel 150. Also, an example of the parameter data would be a data format of pixel, by which the display panel 130 can show the pictures according to the image data. The parameter data has a much less throughput than the image data and is delivered through a second channel 160 from the mainframe 110 to the control module 120. For example, the "parameter-data transmission interface" in the art can be used as the second channel 160. In the embodiment, the first channel 150 and the second channel 160 are different physical circuits as shown in FIG. 2, where the first channel 150 is an image-data transmission interface and the second channel 160 is a parameter-data transmission interface; but it is not limited thereto, the first and second channels 150 and 160 may share a single physical circuit.

Generally, the image data has a much more throughput than the parameter data, so the probability of failure occurring in the first channel 150 is much more than that in the second channel 160. The image data cannot be correctly displayed on the display panel 130 when the first channel 150 fails to work in good working conditions, causing the users unable to obtain enough information for their operation. In the embodiment, the mainframe 110 would generate a response data and forward it through the second channel 160 to the image compositing unit 141, which combines the response data and a pre-determined background picture into a second data signal to be the image signal.

Figure 3:
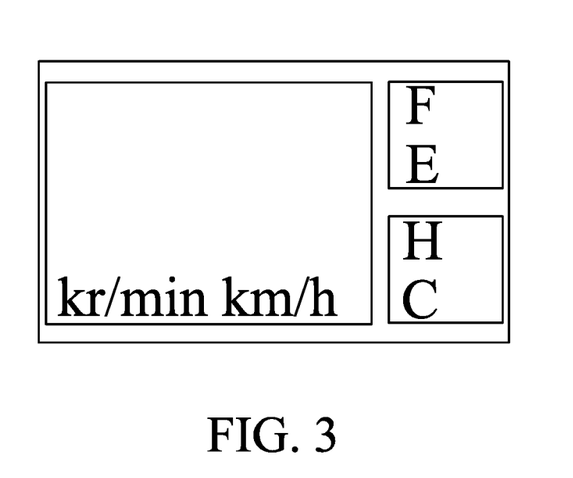
FIG. 3 is a pre-determined background picture in a vehicle-dashboard display example.
Figure 4:
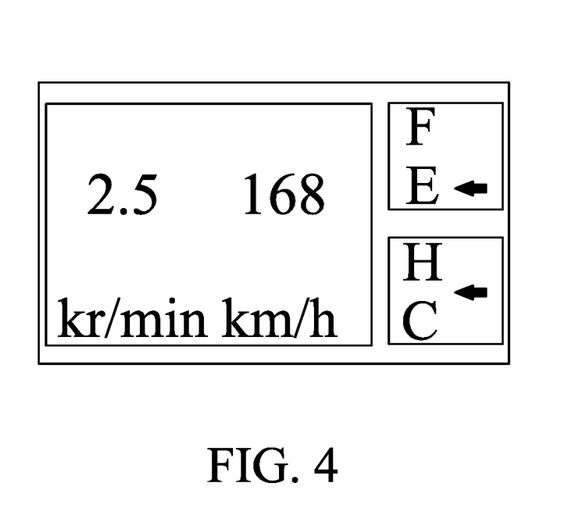
FIG. 4 is the resultant picture in the vehicle-dashboard display example.

Let take a vehicle dashboard as an example. When the first channel 150 fails to work, the display panel 130 cannot show what should be displayed on its screen. However, the driver still needs some basic information such as vehicle speed, motor rotation rate, engine coolant temperature and fuel level, so as to control the vehicle's operation safely. As shown in FIG. 3, a pre-determined background picture can be set in the memory of the image compositing unit 141, including indicators of vehicle speed, motor rotation rate, engine coolant temperature and fuel level. Although the first channel 150 fails to work, the second channel 160 may work in good working conditions. In such a case, the mainframe 110 can generate the response data including what to be shown at proper locations on the pre-determined background picture and forward it through the second channel 160 to the image compositing unit 141. The image compositing unit 141 then proceeds the combination of the response data and the pre-determined background picture. The response data may include values of variables like numerical digit and status flag. For example, if the response data is composed of numerical digits "2", "5", "1", "6", "8", "3" and "5" in sequence, the image compositing unit 141 can combine the above numerical digits with the pre-determined background picture and then deliver an image signal to the display panel 130. Wherein, the first two digits "2" and "5" respectively denote the ones and tenths digits of motor rotation rate in the unit kilo-revolutions per minute (kr/min); that is, the motor rotation rate is 2.5 kr/min in this example. The digits "1", "6", and "8" respectively denote the hundreds, tens, and ones digits of vehicle speed in the unit kilometers per hour (km/hr); that is, the vehicle speed is 168 km/hr in this example. The digit "3" is used to indicate how many tenths of fuel in the tank, from emptiness "E" to fullness "F"; that is, the remainder fuel is about three tenths of the full tank in this example, as indicated by the level of the arrow sign. The digit "5" is used to indicate how many tenths of coolant temperature range between coldness "C" and hotness "H" in the radiator; that is, the engine coolant temperature is about five tenths or one half of the temperature range above coldness "C" in this example, as indicated by the level of the arrow sign. By the above-recited displaying mode, the resultant picture on the display panel 130 can be found in FIG. 4.

Figure 5:
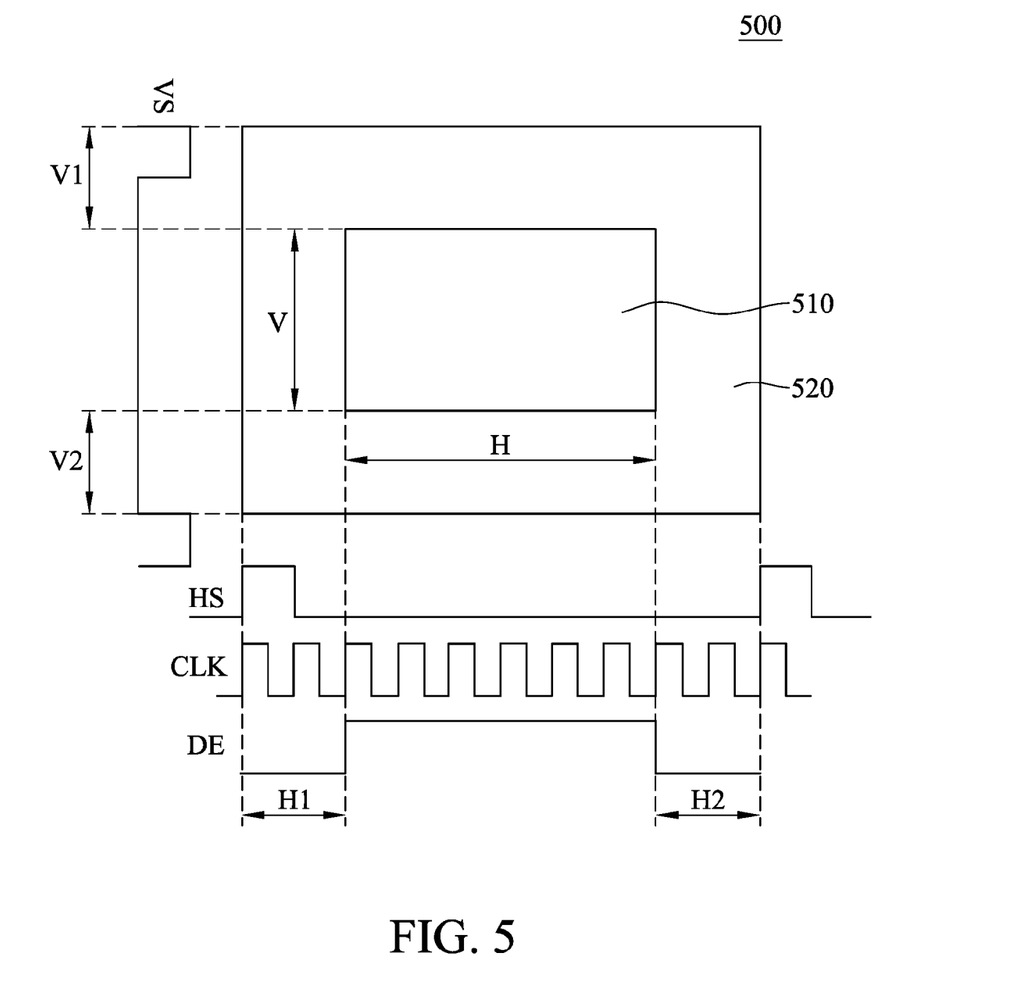
FIG. 5 is a schematic diagram showing a display screen and its relations with the control signals.

Whether the first channel 150 works in good working conditions or not can be judged by the control module 120 according to the control signals including CLK, DE, HS and VS signals. Various ways to assess the working condition of the first channel 150 will be described in detail in the following paragraphs. Please refer to FIG. 5, which is a schematic diagram showing a display screen 500 and its relations with the control signals. The display screen 500 can be divided into an active display area 510 and a non-display area 520 which is a porch enclosing the display area 510. The display area 510 has a horizontal extent, which can be defined, in terms of time, as H cycle periods of the CLK signal in the duration when the DE signal is at logic high level. That is, the horizontal extent can also be defined as H CLK cycle periods after H1 CLK cycle periods since the rising edge of the HS signal. The extent in terms of time can be transformed into its spatial dimension according to the specifications of the display screen. The HS and DE signals have the same cycle period, which is the duration of scanning one horizontal scan line and equal to H1+H+H2 CLK cycle periods. On the other hand, a vertical extent of the display area 510 can be defined V HS cycle periods after V1 HS cycle periods since the rising edge of the VS signal.

The working condition of the first channel 150 can be assessed according to the CLK signal. In the art of display technology, the clock signal has a frequency in the range from 1 MHz to 40 MHz, i.e. a cycle period in the range from 25 ns to 1000 ns. So, if the frequency or period of the received CLK signal is not in the above range, the control module 120 would judge that the first channel 150 fails to work in good working conditions. If the clock signal is interrupted, the control module 120 may receive a CLK signal with a very large cycle period.

Figure 6:
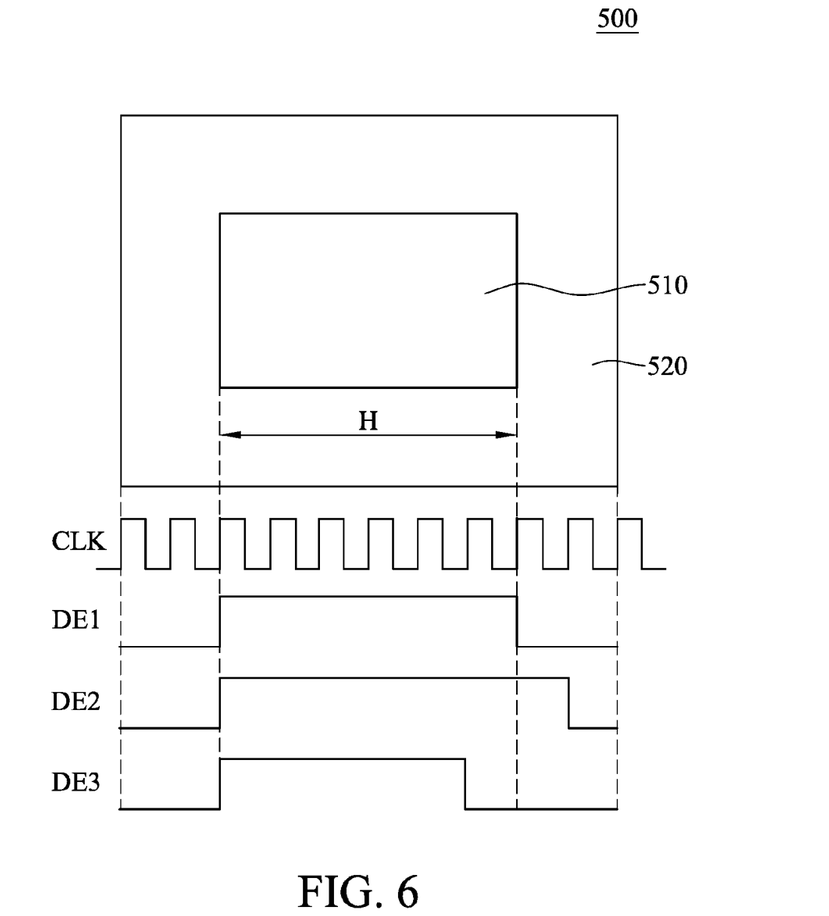
FIG. 6 is a schematic diagram showing the display screen and the relations of its horizontal extent with three possible enabling signals.
Figure 7:
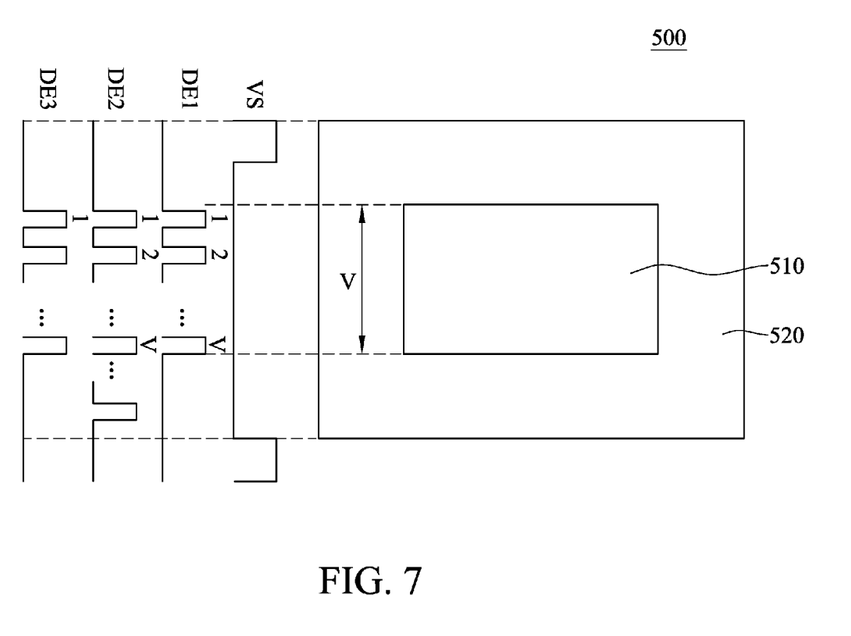
FIG. 7 is a schematic diagram showing the display screen and the relations of its vertical extent with three possible enabling signals.

Also, the working condition of the first channel 150 can be assessed according to the DE signal. Please refer to FIG. 6, which is a schematic diagram showing the display screen 500 and the relations of its horizontal extent with three possible enabling signals DE1, DE2 and DE3. The duration when the DE1 signal is at logic high level is equal to H CLK cycle periods, so if the DE1 signal is delivered to the control module 120, the control module 120 would judge that the first channel 150 works in good working conditions. In contrast with the DE1 signal, the duration when the DE2 signal is at logic high level is more than H CLK cycle periods, and the duration when the DE3 signal is at logic high level is less than H CLK cycle periods. So, if the DE2 or DE3 signal is delivered to the control module 120, the control module 120 would judge that the first channel 150 fails to work in good working conditions. Please refer to FIG. 7, which is a schematic diagram showing the display screen 500 and the relations of its vertical extent with three possible enabling signals DE1, DE2 and DE3. There are V DE1 cycle periods in the vertical extent, so if the DE1 signal is delivered to the control module 120, the control module 120 would judge that the first channel 150 works in good working conditions. In contrast with the DE1 signal, there are less than V DE2 cycle periods and more than V DE3 cycle periods in the vertical extent, so if the DE2 or DE3 signal is delivered to the control module 120, the control module 120 would judge that the first channel 150 fails to work in good working conditions.

Figure 8:
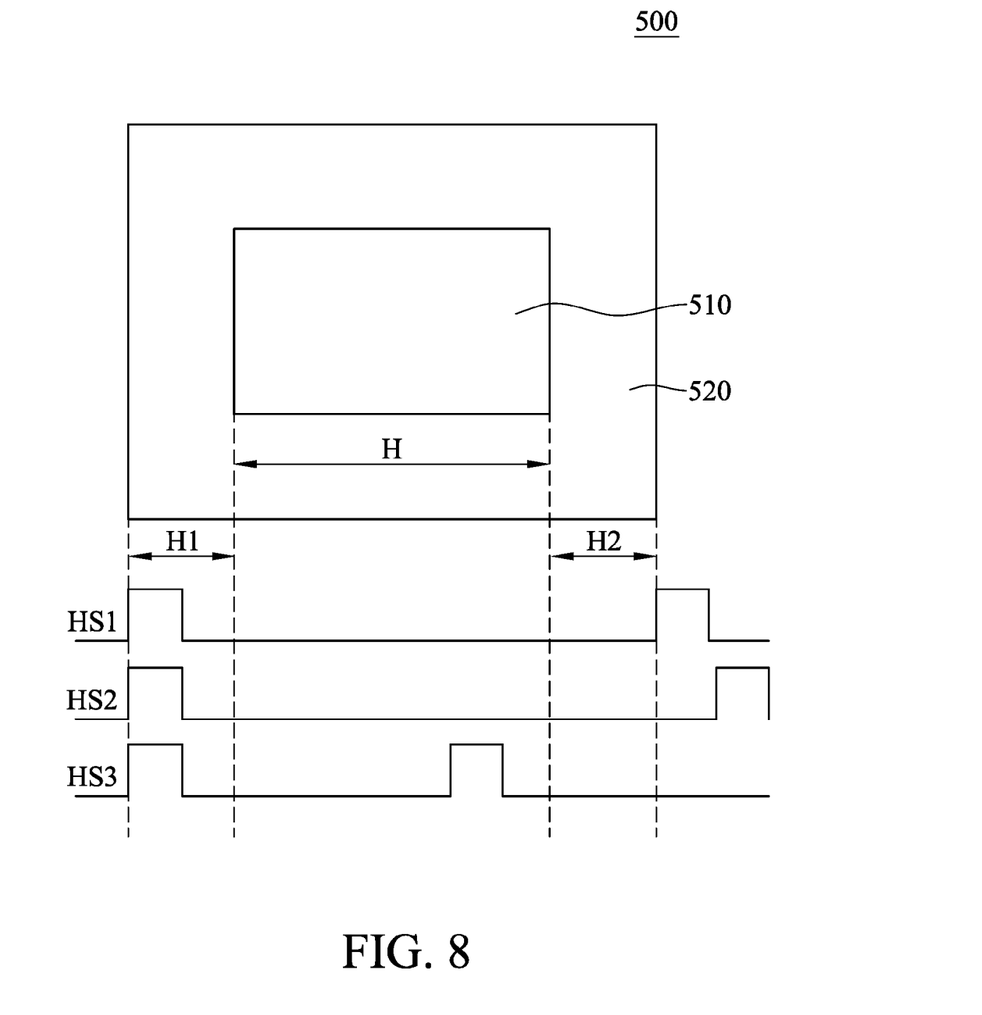
FIG. 8 is a schematic diagram showing the display screen and the relations of its horizontal extent with three possible horizontal synchronization signals.
Figure 9:
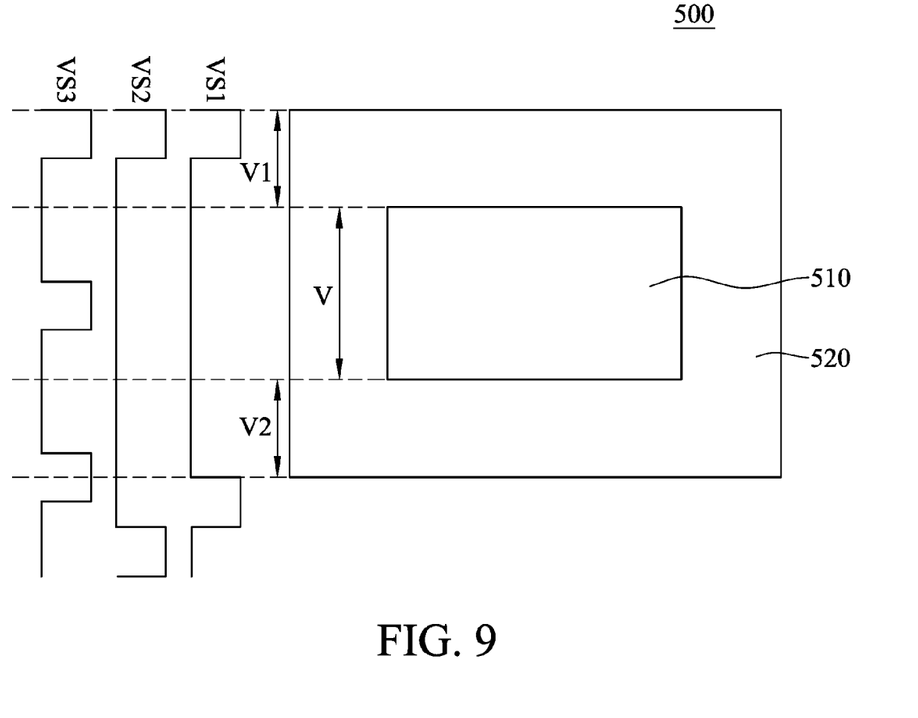
FIG. 9 is a schematic diagram showing the display screen and the relations of its vertical extent with three possible vertical synchronization signals.

Also, the working condition of the first channel 150 can be assessed according to the HS and VS signals. Please refer to FIG. 8, which is a schematic diagram showing the display screen 500 and the relations of its horizontal extent with three possible horizontal synchronization signals HS1, HS2 and HS3 . There are H1+H+H2 CLK cycle periods in a single HS1 cycle period, so if the HS1 signal is delivered to the control module 120, the control module 120 would judge that the first channel 150 works in good working conditions. In contrast with the HS1 signal, there are more than H1+H+H2 CLK cycle periods in a single HS2cycle period and less than H1+H+H2 CLK cycle periods in a single HS3 cycle period, so if the HS2or HS3 signal is delivered to the control module 120, the control module 120 would judge that the first channel 150 fails to work in good working conditions. Please refer to FIG. 9, which is a schematic diagram showing the display screen 500 and the relations of its vertical extent with three possible vertical synchronization signals VS1, VS2 and VS3. There are V1+V+V2 HS cycle periods in a single VS1 cycle period, so if the VS1 signal is delivered to the control module 120, the control module 120 would judge that the first channel 150 works in good working conditions. In contrast with the VS1 signal, there are more than V1+V+V2 HS cycle periods in a single VS2 cycle period and less than V1+V+V2 HS cycle periods in a single VS3 cycle period, so if the VS2 or VS3 signal is delivered to the control module 120, the control module 120 would judge that the first channel 150 fails to work in good working conditions.

In another embodiment, the control module 120 may further include a multiplexer 170 as shown in FIG. 2, configured for selecting one of the first data signal output of the image processing unit 140 and the second data signal output of the image compositing unit 141 as the image signal output of the control module 120. About the judgement of whether the first channel 150 works or fails, the control module 120 may task the image processing unit 140 to do it. So, the image processing unit 140 would assess the working condition of the first channel 150 according to the CLK, DE, HS and VS signals as set forth in the previous paragraphs, and then deliver a decision signal representing the judgement result to the multiplexer 170 and/or the mainframe 110 as shown in FIG. 2. If the first channel works in good working conditions, the multiplexer 170 would select the first data signal output of the image processing unit 140 as the image signal output of the control module 120; otherwise, the multiplexer 170 would select the second data signal output of the image compositing unit 141 as the image signal output of the control module 120. Moreover, a user may instruct the mainframe 110 to issue a command signal, rendering the multiplexer 170 to select either the first data signal output of the image processing unit 140 or the second data signal output of the image compositing unit 141 as the image signal, to be delivered to the display panel 130.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A display system comprising:
    a mainframe;
    a control circuit comprising an image processing unit and an image compositing circuit, communicating with the mainframe through a first channel and a second channel, and generating an image signal; and
    a display panel showing pictures according to the image signal;
    wherein the mainframe provides the image processing unit with image data, parameter data and control signals through both the first and second channels when the first channel works, and the image processing unit processes the image data and the parameter data and generates a first data signal to be the image signal;
    wherein the mainframe provides the image compositing circuit with response data through the second channel when the first channel fails, and the image compositing circuit combines the response data and a pre-determined background into a second data signal to be the image signal;
    wherein the response data include at least one of a numerical digit and a status flag, or the pre-determined background includes at least one indicator of vehicle speed, motor rotation rate, engine coolant temperature and fuel level.

2. The display system of claim 1, wherein the first and second channels share a single physical circuit.

3. The display system of claim 1, wherein the first and second channels use different physical circuits.

4. The display system of claim 1, wherein the control circuit further includes:
    a multiplexer selecting one of the first and second data signals as the image signal generated by the control circuit, according to either a command signal from the mainframe or a decision signal from the image processing unit.

5. The display system of claim 1, wherein the control signals include a clock signal, and the image processing unit judges whether the first channel works or fails by the clock signal's frequency.

6. The display system of claim 5, wherein the control signals further include an enabling signal having two states of logic high and low levels, and the image processing unit judges whether the first channel works or fails by both the clock signal's cycle period and the enabling signal's duration at the logic high level.

7. The display system of claim 5, wherein the control signals further include a horizontal synchronization signal having two states of logic high and low levels, and the image processing unit judges whether the first channel works or fails by both the clock signal's cycle period and the horizontal synchronization signal's cycle period.

8. A display system comprising:
a mainframe;
a control circuit comprising an image processing unit and an image compositing circuit, communicating with the mainframe through a first channel and a second channel, and generating an image signal; and
a display panel showing pictures according to the image signal;
wherein the mainframe provides the image processing unit with image data, parameter data and control signals through both the first and second channels when the first channel works, and the image processing unit processes the image data and the parameter data and generates a first data signal to be the image signal;
wherein the mainframe provides the image compositing circuit with response data through the second channel when the first channel fails, and the image compositing circuit combines the response data and a pre-determined background into a second data signal to be the image signal;
wherein the control signals include a clock signal and an enabling signal having two states of logic high and low levels, and the image processing unit judges whether the first channel works or fails by the clock signal's frequency, the clock signal's cycle period and the enabling signal's duration at the logic high level.

9. The display system of claim 8, wherein the first and second channels share a single physical circuit.

10. The display system of claim 8, wherein the first and second channels use different physical circuits.

11. The display system of claim 8, wherein the control circuit further includes:
a multiplexer selecting one of the first and second data signals as the image signal generated by the control circuit, according to either a command signal from the mainframe or a decision signal from the image processing unit.

12. A display system comprising:
a mainframe;
a control circuit comprising an image processing unit and an image compositing unit, communicating with the mainframe through a first channel and a second channel, and generating an image signal; and
a display panel showing pictures according to the image signal;
wherein the mainframe provides the image processing unit with image data, parameter data and control signals through both the first and second channels when the first channel works, and the image processing unit processes the image data and the parameter data and generates a first data signal to be the image signal;
wherein the mainframe provides the image compositing circuit with response data through the second channel when the first channel fails, and the image compositing circuit combines the response data and a pre-determined background into a second data signal to be the image signal;
wherein the control signals include a clock signal and a horizontal synchronization signal having two states of logic high and low levels, and the image processing unit judges whether the first channel works or fails by the clock signal's frequency, the clock signal's cycle period and the horizontal synchronization signal's cycle period.

13. The display system of claim 12, wherein the first and second channels share a single physical circuit.

14. The display system of claim 12, wherein the first and second channels use different physical circuits.

15. The display system of claim 12, wherein the control circuit further includes:
a multiplexer selecting one of the first and second data signals as the image signal generated by the control circuit, according to either a command signal from the mainframe or a decision signal from the image processing unit.

* * * * *